(12) United States Patent
Pal, Jr. et al.

(10) Patent No.: US 9,630,437 B2
(45) Date of Patent: Apr. 25, 2017

(54) PRINTABLE RECORDING MEDIA

(71) Applicant: Hewlett-Packard Development Company, L.P., Fort Collins, CO (US)

(72) Inventors: Lokendra Pal, Jr., San Diego, CA (US); Xulong Fu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/109,377

(22) PCT Filed: Jan. 21, 2014

(86) PCT No.: PCT/US2014/012264
§ 371 (c)(1),
(2) Date: Jun. 30, 2016

(87) PCT Pub. No.: WO2015/112114
PCT Pub. Date: Jul. 30, 2015

(65) Prior Publication Data
US 2016/0339729 A1    Nov. 24, 2016

(51) Int. Cl.
*B41M 1/08* (2006.01)
*B41M 5/333* (2006.01)
(Continued)

(52) U.S. Cl.
CPC .............. *B41M 5/5236* (2013.01); *B41J 2/01* (2013.01); *B41M 5/3335* (2013.01);
(Continued)

(58) Field of Classification Search
CPC .......... B41J 2/01; B41M 1/08; B41M 5/3335; B41M 5/3377; B41M 5/41; B41M 5/426;
(Continued)

(56) References Cited

U.S. PATENT DOCUMENTS 6,207,258 B1 * 3/2001 Varnell ................ B41M 5/0017
428/32.1
7,285,182 B2 * 10/2007 Mason ................. B41M 5/5218
106/124.1
(Continued)

FOREIGN PATENT DOCUMENTS

WO    2012083015    6/2012

OTHER PUBLICATIONS

International Search Report dated Oct. 21, 2014 for PCT/US2014/012264, Applicant Hewlett-Packard Development Company, L.P.

*Primary Examiner* — Anh T. N. Vo
(74) *Attorney, Agent, or Firm* — HP Inc. Patent Department

(57) ABSTRACT

A printable recording media containing a base substrate and a coating layer having a total solid content ranging from about 3 to about 65 weight percent by total weight of the coating composition and that includes from about 10 to about 90 weight percent of starch nanoparticles having a particle size ranging from about 40 to about 500 nm and from about 10 to about 90 weight percent of a water soluble divalent or multi-valent metal salt. Also described herein are a method for making the printable recording media and a method for producing printed images using the recording media.

15 Claims, 1 Drawing Sheet

(51) Int. Cl.
*D21H 19/54* (2006.01)
*C09D 103/02* (2006.01)
*B41M 5/52* (2006.01)
*B41J 2/01* (2006.01)

(52) U.S. Cl.
CPC ......... *B41M 5/5227* (2013.01); *C09D 103/02* (2013.01); *D21H 19/54* (2013.01); *B41M 5/5218* (2013.01); *B41M 2205/12* (2013.01)

(58) Field of Classification Search
CPC ........ B41M 5/50; B41M 5/502; B41M 5/508; B41M 5/5227; B41M 5/5236; D21H 19/54; C09D 103/02; C09D 103/04; C09D 135/00; C09D 143/00
See application file for complete search history.

(56) References Cited

U.S. PATENT DOCUMENTS

| | | | |
|---|---|---|---|
| 8,101,250 B2 * | 1/2012 | Haenen | B41M 5/502 |
| | | | 347/105 |
| 8,449,665 B2 | 5/2013 | Pal et al. | |
| 9,422,669 B2 * | 8/2016 | Welsch | C08B 30/02 |
| 2002/0037395 A1 | 3/2002 | Zhong et al. | |
| 2006/0078695 A1 | 4/2006 | Sen et al. | |
| 2007/0087138 A1 | 4/2007 | Koenig et al. | |
| 2012/0154502 A1 | 6/2012 | Romano et al. | |
| 2012/0194625 A1 | 8/2012 | Niu et al. | |
| 2012/0212555 A1 | 8/2012 | Romano et al. | |
| 2013/0293647 A1 | 11/2013 | Dannhauser et al. | |

* cited by examiner

PRINTABLE RECORDING MEDIA

BACKGROUND

Inkjet printing is a non-impact printing method in which an electronic signal controls and directs droplets or a stream of ink that can be deposited on a variety of substrates. Current inkjet printing technology involves forcing the ink drops through small nozzles by thermal ejection, piezoelectric pressure or oscillation, onto the surface of a media. This technology has become a popular way of recording images on various media surfaces, particularly paper, for a number of reasons, including low printer noise, capability of high-speed recording and multi-color recording. Inkjet web printing is a technology that is specifically well adapted for commercial and industrial printing.

It has rapidly become apparent that the image quality of printed images using such printing technology is strongly dependent on the construction of the recording media used. Consequently, improved recording media, often specifically designed, have been developed. However, while many developments have been made, it has often created challenges to find effective printable recording media. Accordingly, investigations continue into developing such media substrates.

BRIEF DESCRIPTION OF THE DRAWING

The drawings illustrate various embodiments of the present recording media and are part of the specification.

DETAILED DESCRIPTION

Figure 1:
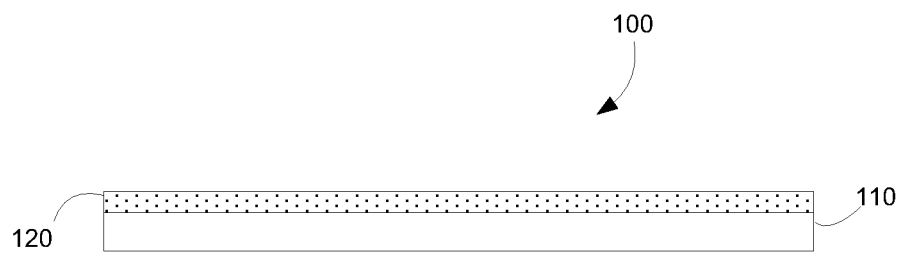
FIGS. 1 and 2 are cross-sectional views of the printable recording media according to embodiments of the present disclosure.

Before particular embodiments of the present disclosure are disclosed and described, it is to be understood that the present disclosure is not limited to the particular process and materials disclosed herein. It is also to be understood that the terminology used herein is used for describing particular embodiments only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. All percent are by weight (wt %) unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

The present disclosure refers to printable recording media containing a base substrate and a coating layer having a total solid content ranging from about 3 to about 65 weight percent by total weight of the coating composition and that comprises from about 10 to about 90 weight percent of starch nanoparticles having a particle size ranging from about 40 to about 500 nm and from about 10 to about 90 weight percent of a water soluble divalent or multi-valent metal salt. The present disclosure refers also to a method for producing printed images using the recording media and to a method for making the printable recording media.

The printable recording media, described herein, provides printed images and articles that demonstrate excellent image quality (good bleed and coalescence performance) while enabling high-speed printing. By high-speed printing, it is meant herein that the printing method can be done at a speed of 50 fpm or higher.

The printable media, described herein, has a fast absorption rate. By "fast absorption rate", it is meant that the water, solvent and/or vehicle of the ink can be absorbed by the media at a fast rate so that the ink composition does not have a chance to interact and cause bleed and/or coalescence issues. The absorption rate is dependent on and is impacted by the speed of the printing and amount of ink being used. The faster the printing speed and the higher the amount of ink used, the higher is the demand on faster absorption from the media. A good diagnostic plot with maximum ink density, especially secondary colors, would be prone to coalescence and a pattern of lines of all primary and secondary colors passing through area fills of primary and secondary colors would be prone to bleed. If no bleed or coalescence is present at the desired printing speed, the absorption rate would be sufficient. Bristow wheel measurements can be used for a quantitative measure of absorption on media wherein a fixed amount of a fluid is applied through a slit to a strip of media that moves at varying speeds.

The printable recording media presents thus a fast absorption rate that drives the ink vehicle quickly from top surface to the bulk of media, and presents high capacity to hold a large amount of ink vehicle while readily fixing the colorants present in ink compositions onto the media surface. These features result in providing good image quality under inkjet printing process conditions. The printable recording media is thus well adapted to be used with inkjet printing process. It is believed that the coating composition of the printable recording media improves the physical qualities of the media containing it, including but not limited to, surface smoothness, whiteness, brightness, opacity, color (a*, b*), anti-yellowing, stiffness and dimensional stability. The printable recording media according to the present disclosure can be a paper-based print medium having photographic image quality. The print medium provides indeed high print quality, high color gamut and good ink absorption. The combination of fast ink absorption speed and ready fixation of colorants on the media surface achieve good image quality as manifested in terms of color gamut and black and color optical density.

The Printable Recording Media

Figure 2:

FIG. 1 and FIG. 2 illustrate the printable recording media (100) as described herein. As illustrated in FIG. 1, the printable media (100) encompasses a supporting base substrate (110) and a coating layer (120) that is applied on one side of the base substrate (110). If the coated side is used as an image-receiving side the other side, i.e. backside, may not have any coating at all, or may be coated with other chemicals (e.g. sizing agents) or coatings to meet certain features such as to balance the curl of the final product or to improve sheet feeding in printer. Such as illustrated in FIG. 2, the coating layer (120) can be applied to both opposing sides of the supporting substrate (110). The double-side coated media has thus a sandwich structure, i.e. both sides of the supporting substrate (110) are coated and both sides may be printed.

The coating layer (120), that is disposed on the supporting base substrate (110), can forms a coating layer having a coat-weight in the range of about 0.5 to about 20 gram per square meter ($g/m^2$ or gsm) on at least one side of the media. The coating layer can have a coat-weight in the range of about 0.5 to about 15 gsm, or in the range of about 2 to about 10 gsm per side. In some examples, the printable recording media contains a coating layer (120) that is applied to only one side of the supporting base substrate (110) and that has a coat-weight in the range of about 0.5 to about 20 gsm. In some other examples, the printable recording media contains coating layers (120) that are applied to both sides of the supporting base substrate (110) and that that have a coat-weight in the range of about 0.5 to about 15 gsm per side.

The Base Substrate

As illustrated in FIG. 1, the printable media (100) contains a base substrate (110) that supports the coating layer(s) (120) and that acts as a bottom substrate layer. Such base print media substrate (i.e. substrate or base substrate or supporting substrate) contains a material that serves as a base upon which the coating layer is applied. The base substrate provides integrity for the resultant printable media. The amount of the coating layer, on the print media, in the dry state, is, at least, sufficient to hold all of the ink that is to be applied to the print media. The base substrate (110) can have a thickness along substantially the entire length ranging between about 0.025 mm and about 0.5 mm.

The base substrate may include any materials which can support a coating composition, for example, natural materials (such as a base including cellulose fibers) or synthetic material, (such as a base including synthetic polymeric fibers) or non-fabric materials (such as a polymeric film) or coated materials (such as offset publishing, offset direct mail, offset transactional papers) or packaging materials (such as solid bleached board, recycled coated board, Kraft papers, corrugated papers) or a mixture of them. The base substrate material has good affinity and good compatibility for the ink that is applied to the material.

Examples of substrates include, but are not limited to, natural cellulosic material, synthetic cellulosic material (such as, for example, cellulose diacetate, cellulose triacetate, cellulose propionate, cellulose butyrate, cellulose acetate butyrate and nitrocellulose), material including one or more polymers such as, for example, polyolefins, polyesters, polyamides, ethylene copolymers, polycarbonates, polyurethanes, polyalkylene oxides, polyester amides, polyethylene terephthalate, polyethylene, polystyrene, polypropylene, polycarbonate, polyvinyl acetal, polyalkyloxazolines, polyphenyl oxazolines, polyethylene-imines, polyvinyl pyrrolidones, and combinations of two or more of the above. In some examples, the media substrate includes a paper base including paper, cardboard, paperboard, paper laminated with plastics, and paper coated with resin. The base substrate may include polymeric binders. Such polymeric binder may be included, for example, when non-cellulose fibers are used. The base substrate may include cellulose fibers and synthetic fibers. The cellulose fibers may be made from hardwood or softwood species. The fibers of the substrate material may be produced from chemical pulp, mechanical pulp, thermal mechanical pulp, chemical mechanical pulp or chemical thermo-mechanical pulp. Examples of wood pulps include, but are not limited to, Kraft pulps and sulfite pulps, each of which may or may not be bleached. Examples of softwoods include, but are not limited to, pine, spruce and hemlock. Examples of hardwoods include, but are not limited to, birch, maple, oak, poplar and aspen. The synthetic fibers may be made from polymerization of organic monomers. The base substrate may also include non-cellulose fibers.

The basis weight of the base substrate is dependent on the nature of the application of the print media where lighter weights are employed for magazines, books and tri-folds brochures and heavier weights are employed for post cards and packaging applications, for example. The substrate can have a basis weight in the range of about 30 grams per square meter ($g/m^2$ or gsm) to about 400 gsm.

In some examples, the base substrate is paper base substrate. In some other examples, the supporting base substrate is paper base substrate having a basis weight of from about 50 to about 300 $g/m^2$.

The Coating Layer

The printable media contains a coating layer (120) disposed onto the base substrate (110). In some example, the coating layer (120) is present on, at least, one side of the base substrate (110). In some other examples, the coating layer (120) is present on both side of the base substrate (110). The coating layer (120) includes a coating formula that comprises from about 10 to about 90 weight percent of starch nanoparticles having a particle size ranging from about 40 to about 500 nm and from about 10 to about 90 weight percent of a water soluble divalent or multi-valent metal salt.

The coating layer (120) has a total solid content ranging from about 3 to about 65 weight percent by total weight of the composition. In some examples, the coating composition has a total solid content ranging from about 5 to about 55 weight percent by total weight of the composition. As used herein, the percentage of total solid content represents the percentage of solid ingredient present in the formulation. In other word, it represents the total amount of solid ingredients and/or components that remain in the composition once the volatile substance is evaporated; in this specific case, when the carrier liquid is evaporated. Without being linked by any theory, it is believed that such "high" percentage of solid content helps to reduce the need for drying energy and, furthermore, enables a faster coating speed.

In some examples, the coating layer comprises from about 10 to about 90 weight percent of starch nanoparticles having a particle size ranging from about 40 to about 500 nm; and from about 10 to about 90 weight percent of a water soluble divalent or multi-valent metal salt. In some other examples, the coating layer comprises from about 20 to about 80 weight percent of starch nanoparticles having a particle size ranging from about 40 to about 500 nm; and from about 20 to about 80 weight percent of a water soluble divalent or multi-valent metal salt. In yet some other examples, the coating layer comprises from about 40 to about 60 weight percent of starch nanoparticles having a particle size ranging from about 40 to about 500 nm; and from about 40 to about 60 weight percent of a water soluble divalent or multi-valent metal salt.

The starch nanoparticles are insoluble starch particles that have an average particle size in the range of about 40 to about 500 nm. In some other examples, the starch nanoparticles are insoluble starch particles that have an average particle size in the range of about 50 to about 300 nm. In some other examples, the starch nanoparticles are insoluble starch particles that have an average particle size is the range of about 60 to about 150 nm.

Without be linked by any theory, it can be said that the starch nanoparticles of the present disclosure are insoluble, have a narrow particle size distribution and form a stable aqueous polymer colloid. The starch nanoparticles as described herein can be produced from starch granules through reactive extrusion process. Thus, in some examples, the starch nanoparticles are extruded starch nanoparticles. In some other examples, the starch nanoparticles can be in the form of a starch dispersion of cross-linked starch nanoparticles in an aqueous liquid.

The starch nanoparticles dispersion can be made from an aqueous liquid comprising starch as starting material, said mixture can then be processed in an extruder with shear forces in the presence of a cross-linker. The resulting mixture can then be dispersed in a suitable solvent, such as water and/or another hydroxylic solvent such as an alcohol, to a concentration of between 4 and 50 wt %, or to a concentration of between 10 and 40 wt %. In some examples, the starch nanoparticles are formed by processing starch using shear forces and, simultaneous, cross-linking Processing using shear forces means herein a mechanical treatment, which is, as an example, an extrusion treatment performed at elevated temperature (above 40° C., or in an example above 60° C., below the degradation point of the polymer, up to 200° C., or in an example up to 140° C.) under conditions of high shear.

In some other examples, the extrusion process encompasses crosslinking. The crosslinking can be reversible, i.e. the crosslinks are partly or wholly cleaved after the mechanical treatment step. Examples of reversible cross-linkers are dialdehydes and polyaldehydes, acid anhydrides and mixed anhydrides (e.g. succinic and acetic anhydride) and the like. Starch nanoparticles can thus be formed into dispersion by processing the starch using shear forces and simultaneously crosslinking. The starch is converted into a thermoplastic melt and is then transformed into an agglomerate of dry cross-linked nanoparticles. In some examples, the starch nanoparticles are in the form of a starch dispersion of cross-linked starch nanoparticles dispersed into an aqueous liquid.

By extrusion process, it is meant herein a process that involves loading of raw material, such as starch, into a hopper at one end of the extruder. The raw material is then continuously fed from the hopper to a heated chamber where the material is softened and carried along by a motor driven feed-screw within. As starch conveyed through the chambers, it is melted and forced out of the chamber at a steady rate through the die. The immediate cooling of the melt results in re-solidification of the starch.

As "starch", it is meant herein native starch or modified starch derivatives. In some examples, the starch is native starch. Non-limiting examples of source of native starch include corn starch, tapioca starch, wheat starch, rice starch, sago starch and potato starch. Non-limiting examples of modified starch include enzyme modified starch, thermal and thermal-chemical modified starch and chemical modified starch. In some examples, the chemical modified starch is selected from chemically converted starches such as acid fluidity starches, oxidized starches and pyrodextrins; derivatized starches such as hydroxyl-alkylated starches, cyanoethylated starch, cationic starch ethers, anionic starches, starch esters, starch grafts, and hydrophobic starches. Mixtures of starch with other biopolymers containing at least 50% by weight of starch can also be used as starting material. Suitable biopolymers are exemplified by other polysaccharides such as cellulose and gums, as well as proteins (e.g. gelatin, whey protein).

The coating layer can comprise from about 10 to about 90 weight percent of starch nanoparticles; or from about 20 to about 80 weight percent of starch nanoparticles; or from about 40 to about 60 weight percent of starch nanoparticles having a particle size ranging from about 40 to about 500 nm.

In addition to starch nanoparticles, the coating layer includes a water soluble divalent or multi-valent metal salt. The water soluble divalent or multi-valent metal salt can be present in the coating layer in an amount representing from about 10 to about 90 weight percent; or from about 20 to about 80 weight percent; or from about 40 to about 60 weight percent by total weight of the coating layer.

The term "water soluble" is meant to be understood broadly as a species that is readily dissolved in water. Thus, water soluble salts may refer to a salt that has a solubility greater than 15 g/100 g $H_2O$ at 1 Atm. pressure and at 200° C. In some examples, the coating layer comprises an organic water soluble metallic salt. Organic metallic salt are ionic compounds composed of cations and anions with a formula such as $(C_nH_{2+1}COO^-M^+)*(H_2O)_m$ where $M^+$ is cation species including Group I metals, Group II metals, Group III metals and transition metals such as, for example, sodium, potassium, calcium, copper, nickel, zinc, magnesium, barium, iron, aluminum and chromium ions. Anion species can include any negatively charged carbon species with a value of n from 1 to 35. The hydrates ($H_2O$) are water molecules attached to salt molecules with a value of m from 0 to 20.

Examples of water soluble divalent or multi-valent salt include, but are not limited to, calcium chloride, magnesium sulfate, calcium acetate, calcium acetate hydrate, calcium acetate monohydrate, magnesium acetate, magnesium acetate tetrahydrate, calcium propionate, calcium propionate hydrate, calcium gluconate monohydrate, and calcium formate and other such salts, anhydrous or hydrated forms. The multivalent metal can be a divalent or trivalent cation. The multivalent metal salt may be a cation selected from the group consisting of $Mg^{2+}$, $Ca^{2+}$, $Ba^{2+}$, $Zn^{2+}$ and $Al^{3+}$, in combination with suitable counter ions. Divalent cations such as $Ca^{2+}$ and $Mg^{2+}$ might be particularly useful. Combinations of cations may also be used.

Specific examples of the divalent or multi-valent metal salt used in the coating include, but are not limited to, calcium chloride, calcium acetate, calcium nitrate, calcium pantothenate, magnesium chloride, magnesium acetate, magnesium nitrate, magnesium sulfate, barium chloride, barium nitrate, zinc chloride, zinc nitrate, aluminum chloride, aluminum hydroxychloride, and aluminum nitrate. Divalent or multi-valent metal salt, used herein, might also include $CaCl_2$, $MgCl_2$, $MgSO_4$, $Ca(NO_3)_2$, and $Mg(NO_3)_2$, including hydrated versions of these salts. In some examples, the water soluble divalent or multi-valent salt can be selected from the group consisting of calcium acetate, calcium acetate hydrate, calcium acetate monohydrate, magnesium acetate, magnesium acetate tetrahydrate, calcium propionate, calcium propionate hydrate, calcium gluconate monohydrate, calcium formate and combinations thereof.

In some examples, the coating layer comprises from about 10 to about 90 weight percent of a water soluble divalent metal salt; or from about 20 to about 80 weight percent of a water soluble divalent metal salt or from about 40 to about 60 weight percent of a water soluble divalent metal salt.

Suitable divalent water soluble metal salts include, but are not limited to, compounds containing calcium or magnesium. The counter ions may vary widely and include chloride, sulfate, nitrate, hydroxide and the like. Illustrative of such materials are calcium chloride, magnesium chloride, and calcium hydroxide. In some examples, water soluble divalent metal salts, for use herein, are water soluble calcium salts, such as calcium chloride or calcium propionate. Water soluble divalent metal salt can be selected from the group consisting of calcium chloride, magnesium chloride, magnesium sulfate, calcium formate, calcium acetate, calcium nitrate, calcium pantothenate, calcium acetate monohydrate, calcium propionate, calcium propionate hydrate, calcium citrate and combinations thereof.

In some examples, the metal salt is calcium chloride and/or calcium propionate. In some other examples, the metal salt is a mixture of calcium chloride and of calcium propionate. In yet some other examples, the metal salt is calcium chloride.

The coating composition may further comprise from about 1 to about 20 weight percent of fillers, based on the total weight of the coating composition. In some examples, the total amount of filler range from about 5 to about 15 weight percent by total weight of the coating composition. Without being limited by any theory, it is believed that the addition of fillers into the coating composition improves the overall quality of the images that is printed thereon (such as color Gamut) and improves the brightness and whiteness of the coated media sheet containing said coating composition. In some examples, the surface coating composition includes fillers in order to further improve inkjet printable substrate surface characteristics such as smoothness, print formation and overall image quality.

In some examples, the fillers can be inorganic pigments or organic pigments. The pigments can be in the form of pigment slurry or pigment dispersion. Fillers can be organic pigments. Non-limited examples of organic pigments include styrene-type plastic pigment, acrylic-type plastic pigment, polyethylene, polymethyl methacrylate, polystyrene and its copolymers, polytetrafluoroethylene (Teflon®) powders, and any combinations of thereof. Other examples of organic pigments include, but are not limited to, microcapsules, urea resin, melamine resin, or the like. The organic pigments can be in a form of solid particles or in a form called "hollow" particles, in other words, where void volumes are present in the particles.

The fillers can be inorganic pigments. Non-limited examples of inorganic pigments include calcium carbonate, ground calcium carbonate, precipitated calcium carbonate, modified calcium carbonate such as calcium phosphate and calcium silicate, kaolin clay, calcined clay, talc, calcium sulfate, barium sulfate, titanium dioxide, zinc oxide, zinc sulfide, zinc carbonate, satin white, aluminum silicate, diatomite, calcium silicate, magnesium silicate, synthetic amorphous silica, colloidal silica, colloidal alumina, pseudo-boehmite, aluminum hydroxide, alumina, lithopone, zeolite, magnesium carbonate, magnesium hydroxide, and various combinations thereof. The fillers can be inorganic pigments selected from the group consisting of silica, clay, kaolin, carbonate, talc, titanium dioxide and zeolites. In some examples, inorganic pigments are selected from the group consisting of fumed silica, silica gel, precipitated silica, colloidal silica, fumed alumina, boehmite, pseudo-boehmite or a mixture thereof. In some other examples, the fillers are ground calcium carbonate.

The coating composition may further contain other additives. Non-limiting examples of such additives include wetting agents, foam control agents, dispersing agents, optical brightening agents (OBAs), dyes and surfactants. Such additives may be incorporated to improve the coating composition and application properties. In some examples, the coating composition is a liquid composition that contains a liquid vehicle. As used herein, the term "liquid vehicle" is defined to include liquid compositions that can be used to carry starch nanoparticles to a substrate. A wide variety of liquid vehicle components may be used. Such liquid vehicles may include a mixture of a variety of different agents, including without limitation, surfactants, co-solvents, buffers, biocides, viscosity modifiers, sequestering agents, stabilizing agents and water.

In some examples, the viscosity of the coating composition may be in the range of from about 10 centipoise to about 1500 centipoise, at a total solid content ranging from about 10 to about 65 percent by total weight of the composition. In some other examples, the viscosity of the coating composition is from about 50 centipoises to about 1000 centipoise at a solid content of from 20 to 45 percent by weight of the composition. In yet some other examples, the viscosity of the coating composition ranges from about 10 to about 300 centipoise at a total solid content ranging from about 10 to about 25 percent by total weight of the composition.

Method for Making the Printable Recording Material

The method of fabricating a printable recording media encompasses: providing a supporting base substrate (110); applying a coating layer composition (120) to, at least, one side of a base substrate; and, then, drying and calendering the coated substrate. Said coating layer composition has a total solid content ranging from about 3 to about 65 weight percent by total weight of the coating composition and that comprises from about 10 to about 90 weight percent of starch nanoparticles having a particle size ranging from about 40 to about 500 nm and from about 10 to about 90 weight percent of a water soluble divalent or multi-valent metal salt.

The coating layer (120) can be applied to the base substrate (110) by using one of a variety of suitable coating methods. Non-limitative examples of coating methods include size-press, air-knife, gravure, flexo, offset, slot die, curtain, spray, blade, roll and Meyer rod. The size presses include puddle-sized press, film-sized press and the like. The puddle-size press may be configured as having horizontal, vertical, or inclined rollers. The film-sized press may include a metering system, such gate-roll metering, blade metering, Meyer rod metering, or slot metering. In an example, a film-sized press with short-dwell blade metering may be used as an application head in view of applying the coating composition. A film-sized press can be used to apply the coating composition to a paper substrate. The coating composition can be applied to paper substrate off-line or in-line of a paper-making machine.

In some examples, after the coating step, the media might go through a drying process to remove water and other volatile components present in the coating layers and substrate. The drying pass may comprise several different drying zones, including, but not limited to, infrared (IR) dryers, hot surface rolls, and hot air floatation boxes. In some other examples, after the coating step, the coated media may receive a glossy or satin surface with a calendering or super calendering step. When a calendering step is desired, the coated product passes an on-line or off-line calender machine, which could be a hard-nip calender, soft-nip calender or a super-calender. The rolls, in the calender machine, may or may not be heated, and certain pressure can be applied to calendering rolls. In addition, the coated product may go through embosser or other mechanical roller devices to modify surface characteristics such as texture, smoothness, gloss, etc.

In some examples, the coating composition is made from an aqueous liquid including starch and divalent or multivalent salt as starting material, the mixture is then processed in an extruder with shear forces in the presence of a cross-linker. The resulting mixture is then dispersed in a suitable solvent, such as water and/or another hydroxylic solvent such as an alcohol, to a concentration of between 4 and 50 wt %, or to a concentration of between 10 and 40 wt %.

A method for making the coating composition may comprise, initially, the dispersion of starch nanoparticles powder into water under agitation. In some examples, the pH of the water is adjusted to about 9.5 (with soda ash for example) before the addition of the starch nanoparticles powder into water. The salt can be either added as dry or pre-dissolved in the water before adding into the starch nanoparticle dispersion. The fillers can also be prepared separately in water under agitation. The filler powder or slurry is added into the starch nanoparticle salt dispersion and mixed under high shear to obtain a uniform dispersion. The final coating solids percentage is adjusted using water to achieve the target coat-weight. In some embodiments, the coating composition of the present disclosure is used for the coating of substrate in view of making a printable recording media.

Method for Producing Printed Images

The method for producing printed images, or printing method, includes providing a printable recording media such as defined herein; applying an ink composition on the coating layer of the print media to form a printed image; and drying the printed image in order to provide, for example, a printed image with enhanced quality.

The printable recording media contains a base substrate and a coating layer having a total solid content ranging from about 3 to about 65 weight percent by total weight of the coating composition and that comprises from about 10 to about 90 weight percent of starch nanoparticles having a particle size ranging from about 40 to about 500 nm and from about 10 to about 90 weight percent of a water soluble divalent or multi-valent metal salt.

In some examples, the printing method for producing images is an inkjet printing method. By inkjet printing method, it is meant herein a method wherein a stream of droplets of ink is jetted onto the recording substrate or media to form the desired printed image. The ink composition may be established on the recording media via any suitable inkjet printing technique. Examples of inkjet method include methods such as a charge control method that uses electrostatic attraction to eject ink, a drop-on-demand method which uses vibration pressure of a Piezo element, an acoustic inkjet method in which an electric signal is transformed into an acoustic beam and a thermal inkjet method that uses pressure caused by bubbles formed by heating ink. Non-limitative examples of such inkjet printing techniques include thus thermal, acoustic and piezoelectric inkjet printing. In some examples, the ink composition is applied onto the recording media using inkjet nozzles. In some other examples, the ink composition is applied onto the recording method using thermal inkjet printheads.

In some examples, the printing method is a capable of printing more than about 50 feet per minute (fpm) (i.e. has a print speed that is more than about 50 fpm). The printing method described herein can be thus considered as a high-speed printing method. The web-speed could be from about 100 to about 4000 feet per minute (fpm). In some other examples, the printing method is a printing method capable of printing from about 100 to about 1000 feet per minute. In yet some other examples, the printing method is capable of printing at a web-speed of more than about 200 feet per minute (fpm).

In some example, the printing method is a high-speed web press printing method. As "web press", it is meant herein that the printing technology encompasses an array of inkjet nozzles that span the width of the paper web. The array is thus able, for example, to print on 20", 30", and 42" or wider wide web on rolled papers. In some examples, the printing method as described herein prints on one-pass only. The paper passes under each nozzle and printhead only one time as opposed to scanning type printers where the printheads move over the same area of paper multiple times and only a fraction of total ink is used during each pass. The one-pass printing puts 100% of the ink from each nozzle/printhead down all at once and is therefore more demanding on the ability of the paper to handle all of the ink in a very short amount of time.

As mentioned above, a print media in accordance with the principles described herein may be employed to print images on one or more surfaces of the print media. In some examples, the method of printing an image includes depositing ink that contains particulate colorants. A temperature of the print media during the printing process is dependent on one or more of the nature of the printer, for example. Any suitable printer may be employed such as, but not limited to, offset printers and inkjet printers. In some examples, the printer is a HP T350 Color Inkjet Webpress printer (Hewlett Packard Inc.). The printed image may be dried after printing. The drying stage may be conducted, by way of illustration and not limitation, by hot air, electrical heater or light irradiation (e.g., IR lamps), or a combination of such drying methods. In order to achieve best performances, it is advisable to dry the ink at a maximum temperature allowable by the print media that enables good image quality without deformation. Examples of a temperature during drying are, for examples, from about 60° C. to about 205° C., or from about 120° C. to about 180° C. The printing method may further include a drying process in which the solvent (such as water), that can be present in the ink composition, is removed by drying. As a further step, the printable recording media can be submitted to a hot air drying systems. The printing method can also encompass the use of a fixing agent that will retain with the pigment, present in the ink composition that has been jetted onto the media.

EXAMPLES

Ingredients:

TABLE 1

| Ingredient name | Nature of the ingredient | supplier |
| --- | --- | --- |
| Penford Gum ® 280 | Starch | Penford Product Company |
| Ecosphere ® 2202 | Nanoparticle starch | EcoSynthetix Inc. |
| Calcium Chloride | Salt | Univar |
| Calcium Propionate | Salt | Sigma Aldrich |
| Hydrocarb ® 90 | Fillers - Carbonate | Omya AG |

Example 1

Coating Layer Formulations

A series of coated paper samples are prepared with coating compositions made according to formulas 1 to 11 as illustrated in the Table 2 below. In all formulations, chemicals are mixed together in a beaker by using normal benchtop mixing equipment. The numbers express the weight percentage (wt %) of each component based on the dry total weight of the coating composition. Coating layer formulas 1, 2 and 3 are comparatives examples.

In formulas 1 to 13, the total solid content and the Brookfield viscosity are measured. The solid content is measured using a CEM Microwave and the Brookfield viscosity is measured using a Brookfield DVII Viscometer at 100 rpm. The viscosity is expressed in cps. All are mixed in order to have a coating composition having a total solid content of about 15%. The total solid content is expressed in weight percentage based on the total weight of the coating composition. Penford Gum®280 is a Starch solution prepared by adding the starch in water at room temperature while mixing at medium shear using a Cowles blade. Such mixture is cooked at 90° C. for 30 minutes and then cooled to room temperature. Ecosphere®2202 is a nanoparticle Starch solution containing particles that have an average particle size of about 70 nm (The particle size of Ecosphere®2202 solution was measured using Zetasizer Nano ZS, Model No. ZEN3600 supplied by Malvern Instruments) that is prepared by adding the nanoparticle to warm water (120° F.); the pH is adjusted to 9.5 by adding soda ash (~0.1%). The mixture is mixed at medium shear using a Cowles blade for 30 minute and at a temperature of around 50° C. Calcium chloride and calcium propionate are pre-dissolved solution.

Printing performances (Color Gamut, KOD, bleed and coalescence) are measured. All results are illustrated in Table 3 and Table 4. Table 3 illustrates the image performances of printable recording media that are printed in a "Brochure Mode". Table 4 illustrates the image performances of printable recording media that are printed in a "Plain Paper Mode".

The black optical density (KOD) measures the reflectance of the area filled using an X-RITE®939 Spectro-densitometer. The higher the KOD value is, the darker the black colored image obtained. L*min value testing is carried out on a black printed area and is measured with an X-RITE®939 Spectro-densitometer, using D65 illuminant and 2 degree observer angle. This measure determines how "black" the black color is. A lower score indicates a better performance. Gamut Measurement represents the amount of color space covered by the ink on the media. Gamut volume is calculated using L*a*b* values of 8 colors (cyan, magenta, yellow, black, red, green, blue, white) measured with an X-RITE®939 Spectro-densitometer (X-Rite Corporation), using D65 illuminant and 2o observer angle. A higher score indicates a better performance. The coalescence and dry time are evaluated visually and ranked accordingly (with 1 being the worst rank and 5 being the best rank).

TABLE 2

| Formula: | 1 | 2 | 3 | 4 | 5 | 6 | 7 | 8 | 9 | 10 | 11 |
|---|---|---|---|---|---|---|---|---|---|---|---|
| Penford Gum ® 280 | 100 | — | — | — | — | — | — | — | — | — | — |
| Ecosphere ® 92202 | — | 100 | 95 | 75 | 60 | 40 | 20 | 10 | 40 | 75 | 60 |
| Calcium Chloride | — | — | 5 | 25 | 40 | 60 | 80 | 90 | 40 | — | — |
| Calcium Propionate | — | — | — | — | — | — | — | — | — | 25 | 40 |
| Hydrocarb ® 90 | — | — | — | — | — | — | — | — | 20 | — | — |
| Total Dry Parts | 100 | 100 | 100 | 100 | 100 | 100 | 100 | 100 | 100 | 100 | 100 |
| Brookfield Viscosity (cps) | 533.1 | 21 | 17.7 | 19.5 | 9.9 | 5.1 | 6.6 | 8.4 | 7.2 | 16.5 | 18.9 |
| Spindle# | 3 | 2 | 2 | 2 | 2 | 2 | 2 | 2 | 2 | 2 | 2 |
| pH | 7.11 | 3.25 | 2.97 | 2.78 | 2.79 | 3.07 | 6.13 | 6.82 | 6.77 | 6.54 | 6.82 |
| Total solid (%) | 14.8 | 14.2 | 14.7 | 15.6 | 15.2 | 15.3 | 14.6 | 15.0 | 15.6 | 14.8 | 14.7 |

Example 2

Printable Recording Media Performances

A series of coated paper samples are prepared with coating compositions made according to formulas 1 to 13. Each coating composition is coated on a base paper stock by using Mayer rod system at a coat-weight of 3 grams per square meter (g/m²). The base substrate is a 60 g/m² paper with a furnish of approximately 70% hardwood and of 30% softwood fibers. The base contains approximately 10% ash (inorganic fillers). The coated samples are then dried by a normal heat gun. After drying, the coated recording media is calendered using a single nip lab super-calender machine at low pressure and temperature conditions (80° F., 1000 psi, 1 nip).

The printable recording media samples are printed using HP Office jet Pro 8100 printer with pigment based inks in a "Brochure Print Mode" and in a "Plain Paper Print Mode". (The color profiles of a brochure print mode and of a plain paper print mode are different. Such modes also use different amount of inks and have different GCR (Gray component replacement)).

TABLE 3

| Printable recording media | Gamut | L * min | KOD | Dry Time | Coalescence |
|---|---|---|---|---|---|
| sample 1 (comparative) | 220590 | 25.3 | 1.36 | 2 | 1 |
| sample 2 (comparative) | 178873 | 28.8 | 1.24 | 5 | 3 |
| sample 3 (comparative) | 220281 | 25.6 | 1.34 | 4 | 2 |
| sample 4 | 230286 | 24.1 | 1.39 | 4 | 5 |
| sample 5 | 260075 | 21.9 | 1.48 | 4.5 | 5 |
| sample 6 | 255078 | 22.7 | 1.43 | 5 | 5 |
| sample 7 | 262910 | 22.4 | 1.44 | 4.5 | 5 |
| sample 8 | 250795 | 22.9 | 1.41 | 5 | 5 |
| sample 9 | 257029 | 22.7 | 1.44 | 5 | 5 |
| sample 10 | 248508 | 21.6 | 1.46 | 5 | 5 |
| sample 11 | 250394 | 22.6 | 1.44 | 4.5 | 5 |

TABLE 4

| Printable recording media | Gamut | L * min | KOD | Dry Time | Coalescence |
|---|---|---|---|---|---|
| sample 1 (comparative) | 192472 | 30.8 | 1.18 | 1 | 1 |
| sample 2 (comparative) | 191727 | 29.6 | 1.20 | 3 | 2 |
| sample 3 (comparative) | 208710 | 26.7 | 1.28 | 2 | 2.5 |

TABLE 4-continued

| Printable recording media | Gamut | L * min | KOD | Dry Time | Coalescence |
|---|---|---|---|---|---|
| sample 4 | 218717 | 26.4 | 1.30 | 2 | 4.5 |
| sample 5 | 239234 | 24.3 | 1.37 | 3 | 5 |
| sample 6 | 246481 | 22.5 | 1.43 | 4 | 5 |
| sample 7 | 240964 | 24.1 | 1.42 | 5 | 5 |
| sample 8 | 253584 | 21.0 | 1.50 | 4 | 5 |
| sample 9 | 244612 | 23.1 | 1.39 | 4.5 | 5 |
| sample 10 | 225403 | 24.8 | 1.36 | 5 | 4.5 |

The invention claimed is:

1. A printable recording media comprising:
   a. a base substrate;
   b. a coating layer having a total solid content ranging from about 3 to about 65 weight percent by total weight of the coating composition and that comprises:
      i. from about 10 to about 90 weight percent of starch nanoparticles having a particle size ranging from about 40 to about 500 nm,
      ii. and from about 10 to about 90 weight percent of a water soluble divalent or multi-valent metal salt.

2. The printable recording media of claim 1 wherein the coating layer comprises:
   a. from about 20 to about 80 weight percent of starch nanoparticles having a particle size ranging from about 40 to about 500 nm;
   b. and from about 20 to about 80 weight percent of a water soluble divalent or multi-valent metal salt.

3. The printable recording media of claim 1 wherein the coating layer comprises:
   a. from about 40 to about 60 weight percent of starch nanoparticles having a particle size ranging from about 40 to about 500 nm
   b. and from about 40 to about 60 weight percent of a water soluble divalent or multi-valent metal salt.

4. The printable recording media of claim 1 wherein the water soluble divalent or multi-valent metal salt of the coating layer is selected from the group consisting of calcium acetate, calcium acetate hydrate, calcium acetate monohydrate, magnesium acetate, magnesium acetate tetrahydrate, calcium propionate, calcium propionate hydrate, calcium gluconate monohydrate, calcium formate and combinations thereof.

5. The printable recording media of claim 1 wherein the metal salt of the coating layer is calcium chloride and/or calcium propionate.

6. The printable recording media of claim 1 wherein the total solid content of the coating layer is ranging from about 5 to about 55 weight percent by total weight of the coating composition.

7. The printable recording media of claim 1 wherein the starch nanoparticles, of the coating layer, have an average particle size ranging from about 60 to about 150 nm.

8. The printable recording media of claim 1 wherein the coating layer composition further comprises fillers in an amount representing from about 1 to about 20 weight percent of the total weight of the coating composition.

9. The printable recording media of claim 8 wherein the filler are inorganic pigments selected from the group consisting of silica, clay, kaolin, carbonate, talc, titanium dioxide and zeolites.

10. The printable recording media of claim 8 wherein the fillers are ground calcium carbonate.

11. The printable recording media of claim 1 wherein the coating layer has a coat-weight ranging from about 0.5 gsm to about 20 gsm on at least one side of said media.

12. The printable recording media of claim 1 wherein the coating layer is applied to both surfaces of the base substrate and has a coat-weight in the range of about 0.5 to about 15 gsm per side.

13. A method of fabricating a printable recording media comprising:
   a. providing a supporting substrate;
   b. applying a coating layer having a total solid content ranging from about 3 to about 65 weight percent by total weight of the coating composition and that comprises from about 10 to about 90 weight percent of starch nanoparticles having a particle size ranging from about 40 to about 500 nm and from about 10 to about 90 weight percent of a water soluble divalent or multi-valent metal salt;
   c. drying and calendering the coated substrate.

14. A method for producing printed images comprising:
   a. obtaining a printable recording media containing a base substrate and a coating layer having a total solid content ranging from about 3 to about 65 weight percent by total weight of the coating composition and that comprises from about 10 to about 90 weight percent of starch nanoparticles having a particle size ranging from about 40 to about 500 nm and from about 10 to about 90 weight percent of a water soluble divalent or multi-valent metal salt;
   b. applying an ink composition on the coating layer of said print media to form a printed image;
   c. and drying the printed image.

15. The method of claim 14 wherein the ink composition is applied onto the printable recording media via inkjet nozzles.

* * * * *

UNITED STATES PATENT AND TRADEMARK OFFICE
CERTIFICATE OF CORRECTION

PATENT NO. : 9,630,437 B2
APPLICATION NO. : 15/109377
DATED : April 25, 2017
INVENTOR(S) : Lokendra Pal et al.

Page 1 of 1

It is certified that error appears in the above-identified patent and that said Letters Patent is hereby corrected as shown below:

On the Title Page

Inventors section, "Lokendra Pal, Jr." should be --Lokendra Pal--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*